United States Patent [19]
Hill et al.

[11] 3,958,154

[45] May 18, 1976

[54] DUPLEX SURGE ARRESTORS

[75] Inventors: John Hill, Bickley; Henryk Turczanski, Beckenham; Frederick Henry Wallis, Turnbridge Wells, all of England

[73] Assignee: Comtelco (U.K.) Limited, Tonbridge, England

[22] Filed: Nov. 20, 1974

[21] Appl. No.: 525,622

[30] Foreign Application Priority Data

Nov. 20, 1973 United Kingdom............... 53725/73

[52] U.S. Cl. .................................... 317/62; 313/217; 317/66; 317/69

[51] Int. Cl.² ............................................ H02H 9/06

[58] Field of Search .................... 317/16, 61, 62, 66, 317/69, 76; 313/209, 217, 218, 220; 337/28, 29, 32, 33, 34

[56] References Cited

UNITED STATES PATENTS 3,676,743 7/1972 Bahr et al. .......................... 313/218

3,866,091 2/1975 Kawiecki ............................. 317/69

FOREIGN PATENTS OR APPLICATIONS 1,924,781 11/1970 Germany .............................. 317/62

*Primary Examiner*—J. D. Miller
*Assistant Examiner*—Harry Moose
*Attorney, Agent, or Firm*—Weingarten, Maxham & Schurgin

[57] ABSTRACT

This invention relates to a duplex surge arrestor comprising two gas-filled surge arrestors showing commoned electrodes through which commoned electrodes extends a passage for conveying ionised gas from one arrestor to the other, and in which duplex surge arrestor the electrodes are of such shape, disposition and material that when an excessive dissipation of energy occurs on any two electrodes therein, the discharging electrodes melt and fuse together.

8 Claims, 2 Drawing Figures

DUPLEX SURGE ARRESTORS

This invention relates to surge arrestor having electrodes which provide a discharge path whenever a predetermined voltage thereacross is exceeded, and in particular to surge arrestors such as described in co-pending U.S. Ser. No. 423,744 filed Dec. 11, 1973, now U.S. Pat. No. 3,878,423 in which a permanent short circuit between the electrodes is created by an excessive surge causing the electrodes to fuse together.

In telecommunication practice it has been proposed to protect a pair of telephone lines with a respective surge arrestor connected between each line and earth. Such an arrangement, whilst affording certain protection to each line, cannot relieve the electrical stress to which a pair of lines would be subjected in the circumstances where one line receives a surge voltage in excess of its respective arrestor's break-down voltage, whilst the other line receives a surge voltge slightly less than the breakdown voltage of its respective arrestor. The first mentioned line voltage drops to zero, or thereabouts, leaving a voltage difference between the two lines equal to the surge voltage on the second line.

In order to guard against these circumstances, three-electrode arrestors have been proposed in which two of the electrodes are each connected to a respective line whilst the third electrode is connected to earth. The three electrodes are enclosed within the same gas-filled envelope of insulating material, and in mutually spaced relationship such that, should a discharge occur between a line electrode and the earthed electrode, the resulting ionisation of the gas within the envelope reduces the voltage at which breakdown occurs between the other line electrode and earth, to very low levels. Such proposed arrestors however, have not been provided with the fail-safe characteristics of those arrestors disclosed in copending U.S. Ser. No. 423,744 filed Dec. 11, 1973, now U.S. Pat. No. 3,878,423, instead, a spring loaded mechanical shorting bar has been proposed situated externally to the arrestor and prevented from moving into shorting contact with the two line electrode connections and earth by means of a slug of fusible material interposed between the external surface of the earthed electrode and the shorting bar. When the power dissipated during a surge discharge exceeds a predetermined level, the heat generated by the inter-electrode discharge causes the slug to melt, thus permitting the shorting bar to move into contact with, so as to bridge, all three electrode external connections. Such a fail-safe device has the disadvantage that it is external to the arrestor and accordingly occupies space that could be otherwise utilized.

The invention accordingly provides a duplex surge arrestor, symmetrical about a longitudinal axis comprising: a first line-electrode having a first discharge surface; a second line electrode having a second discharge surface; an earth-electrode having a central portion with third and fourth discharge surfaces at opposite ends thereof; a first tubular housing of electrically insulating material, carrying at one end thereof in sealed engagement therewith, said first line-electrode, and joined in sealed engagement at the other end thereof to the central portion of said earth-electrode, all so that a first discharge gap is defined within the housing between said first and third discharge surfaces; a second tubular housing of electrically insulating material, carrying at one end thereof in sealed engagement therewith said second line-electrode, and joined in sealed engagement at the other end thereof to the central portion of said earth-electrode, all so that a second discharge gap is defined within the housing between said second and fourth discharge surfaces; in which said earth-electrode is adapted to provide gas communication between the first and second housing, in which said housings contain gas of selected ionisation potential, in which all three electrodes are provided with terminals to which external electrical connection may be made, and in which the material and shape of the three electrodes is such that should excessive discharge occur between a said line-electrode and the common earth-electrode, the discharging electrode will fuse together.

The purpose of the gas cummunication between the first and second housings is to permit ionised gas to pass from one housing to the other.

The discharge surfaces, and in particular the internal wall of each housing immediately adjacent the first and second discharge gaps may, in accordance with a further aspect of the invention, be coated with electron-emissive substance of low work-potential generally as disclosed in co-pending U.S. patent application Ser. No. 510,141, filed Oct. 4, 1973.

An embodiment of the invention will now be described with reference to the accompanying drawings which are as follows.

Figure 1:
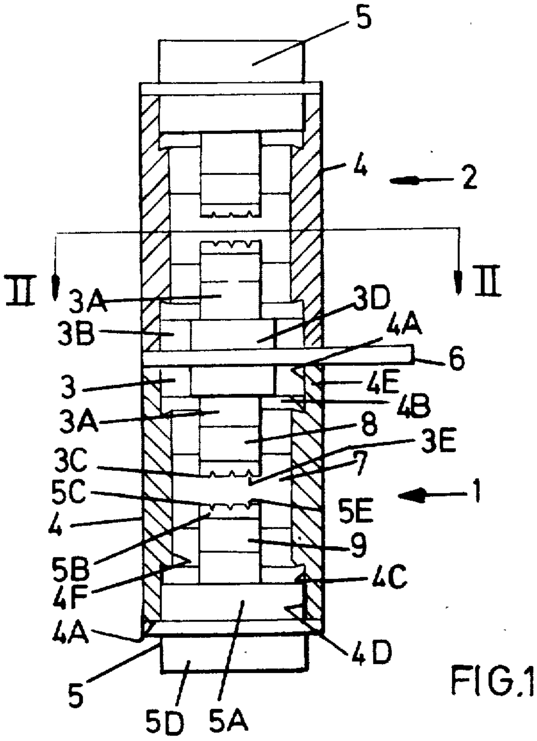
FIG. 1 shows in sectional elevation a duplex surge arrestor whilst.

Referring to both figures, the duplex arrestor comprises two otherwise single arrestor assemblies (arrows 1 and 2) mutually integrated by a common electrode 3 which has a central cylindrical portion 3B from opposite sides of which extend two identical cylindrical or rod-like extensions 3A the ends 3C of which constitute discharge surfaces.

The central portion 3B is of such diameter as to fit snugly in a hole 6A of a tag-like terminal 6.

Two identical line-electrodes 5 are provided each having a terminal portion 5D, a cylindrical boss 5A integral with the terminal portion 5D and from which extends a cylindrical member 5B terminating in a discharge surface 5C. Two identical tubular housings 4 of alumina are also provided each having, a co-axial bore 4F extending therethrough, metallised end surfaces 4A, a co-axial bore 4E at one end thereof for receiving in snug engagement the central portion 3B of the common electrode 3, a co-axial bore 4D at the other end thereof for receiving in snug engagement the boss 5A of a line-electrode 5.

Before assembly of the duplex arrestor, a band 7 of electron emissive substance, such as a compound of strontium, calcium and barium oxides in a suitable binder, is deposited on the surface of bore 4F in a region coinciding approximately with the position of discharge surfaces 3C and 5C when assembled. Similarly, bands 8 and 9 of the emissive material are painted onto respective electrodes 3 and 5. Discharge surfaces 3C and 5C are both provided with a number of depressions, or grooves, 3E and 5E and a spot 10 of emissive material is painted thereon.

It can be seen in the figures that the central portion 3B of the common electrode 3 is partially cut-away on two opposite sides to provide two flats 3D.

Figure 2:
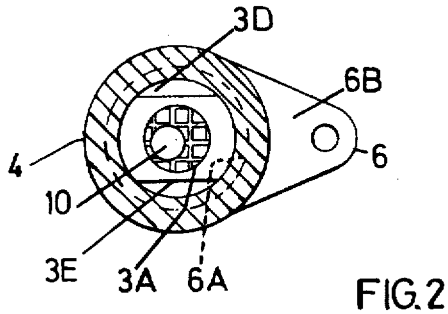
FIG. 2 depicts a section II—II thereof.

The arrestor components are assembled, as illustrated in FIGS. 1 and 2, with brazing or hard-solder material placed between metallized surfaces 4A and the components mating therewith, and the whole assembly placed in a chamber wherein it is evacuated, filled with a gas such as argon to a selected pressure, and heated sufficiently to melt the brazing material which, upon subsequent cooling, hermetically seals the arrestor assembly.

The brazing material selected has sufficient fluidity when molten, to flow into the joint between terminal 6 and central portion 3B thus ensuring electrical connection between these two components.

Flats 3D on common electrode 3 afford gas communication between the two housings 4.

The material of electrodes 3 and 5 is a nickel-iron alloy, and the dimensions of these electrodes is such that when a discharge between any two surfaces 3C and 5C exceeds a predetermined level, the ends of portions 3A and 5B of the respective discharging electrodes 3 and 5 immediately adjacent respective surfaces 3C and 5C, melt and fuse together.

The bores 4E and 4D are of such length that, after final assembly and brazing operations, an annular recess 4B and 4C respectively, is created at each end of each housing 4. These recesses are known as "setbacks" and serve to prevent deposition of electrode material along the whole exposed length of bores 4F, due to sputtering action during a discharge. Such deposition, unless discontinuous along the length of the housing will create a leakage path between the two electrodes which will considerably shorten the arrester's working life.

What is claimed is:

1. A duplex surge arrestor comprising:

first and second electrically insulative housing;

first and second solid conductive line electrodes having respective similar predetermined first and second discharge surface configurations, said electrodes sealed to respective ends of said first and second housings to position said discharge surfaces in longitudinal axial spaced relationship within said first and second housings;

an earth electrode assembly sealed between confronting ends of said first and second housing to form a unitary, axially aligned, hermetically sealed enclosure containing a gas of selected ionization potential, said earth electrode having a central, solid electrode portion with third and fourth discharge surfaces at opposite ends thereof, said third and fourth discharge surfaces being similar to said first and second discharge surfaces and disposed within said first and second housings such that said first and third discharge surfaces precisely define a predetermined first discharge gap and second and fourth discharge surfaces precisely define a predetermined second discharge gap, said first and second discharge gaps each adapted to break down and fuse together their respective discharge surfaces when subjected to a high surge overload voltage; and gas communication means through the periphery of said earth electrode assembly between the electrode portion of said earth electrode assembly and the facing surface of said first and second housings and providing gas communication between said first and second housings such that when one of the line electrodes is subjected to a high overload voltage, gas within the respective housing is ionized and conveyed to the other housing to substantially reduce the breakdown potential of the remaining discharge gap.

2. A duplex surge arrestor according to claim 1, in which at least one of said discharge surfaces is coated with an electron emissive substance of low work-potential.

3. A duplex surge arrestor according to claim 1, in which the said first and second line-electrodes and the said earth-electrode are made of an iron-nickel alloy.

4. A duplex surge arrestor according to claim 1, in which each of the said first and second tubular housings are of alumina, the ends of which are metallized and to which ends are brazed the respective electrodes.

5. A duplex surge arrestor according to claim 1 wherein predetermined areas of the internal walls of said first and second housings immediately adjacent to the respective first and second discharge gaps are coated with an electron emissive substance of low work potential.

6. A duplex surge arrestor according to claim 1 wherein said first and second housings are tubular;

and wherein said first and second line electrodes each have a peripheral portion cooperative with respective ends of said housings and hermetically sealed thereto;

and wherein said earth electrode assembly includes a peripheral portion cooperative with the confronting ends of said housings and hermetically sealed thereto, and an electrically conductive terminal portion affixed to said earth electrode assembly and extending outwardly of said housings.

7. A duplex surge arrestor according to claim 6 wherein said gas communication means includes at least one opening through the peripheral portion of said earth electrode assembly and extending axially along said housings and spaced from said earth electrode.

8. A duplex surge arrestor according to claim 7 wherein said tubular housings each include an annular recess at each end thereof sealed to said respective electrodes and providing setbacks to prevent leakage path formation between electrodes.

* * * * *